United States Patent [19]

Lytle et al.

[11] 4,100,480

[45] Jul. 11, 1978

[54] POSITION AND VELOCITY SENSORS

[75] Inventors: Dan R. Lytle, Canoga Park; Ronald C. Burski, Simi Valley, both of Calif.

[73] Assignee: Dataproducts Corporation, Woodland Hills, Calif.

[21] Appl. No.: 716,162

[22] Filed: Aug. 20, 1976

[51] Int. Cl.² .............................................. G05F 7/00
[52] U.S. Cl. .................................. 323/51; 101/93.09; 323/52; 323/92; 340/199; 324/207
[58] Field of Search ........................ 101/93.16, 93.09; 310/27; 323/51, 52, 53, 54, 92; 336/110, 130; 340/195, 196, 197, 199; 324/34 D, 34 PS, 163, 174

[56] References Cited

U.S. PATENT DOCUMENTS

| 2,555,853 | 6/1951 | Irwin .................... 324/34 R |
| 2,764,019 | 9/1956 | Lindholm et al. ............ 310/27 |
| 3,085,191 | 4/1963 | Sleeper .................... 323/51 |
| 3,225,289 | 12/1965 | Koppel .................... 323/51 |
| 3,244,956 | 4/1966 | Mierendorf ................ 323/52 |
| 3,911,814 | 10/1975 | Helms et al. ............ 101/93.16 |
| 3,943,443 | 3/1976 | Kimura et al. ............. 324/163 |

OTHER PUBLICATIONS

Electronics World, Dec. 1968, pp. 47-50, 66, 67, "Differential Transformers", by S. L. Silver.
Schmintz Info. Trans. Mod. & Noise; McGraw Hill; Jan. 30, 1959; "LVDT Application Note S9-14", pp. 1-8.

*Primary Examiner*—Gerald Goldberg
*Attorney, Agent, or Firm*—Lindenberg, Freilich, Hornbaker, Wasserman, Rosen & Fernandez

[57] ABSTRACT

A sensor of the linear voltage differential transformer (LVDT) type is described, with a moveable core, which has both high permeability and magnetic retentivity, to thereby provide both position and velocity signals. Also described are various embodiments of a position sensor which provides a position signal of the same amplitude, example a null, whenever the sensor's core is at any one of controllable selected positions within the sensor. Any of these sensors may include a core with magnetic retentivity to provide a velocity signal. A servo control system is disclosed, utilizing the position signals from one of the sensors, as described, to control the positioning of an element at either of two positions.

31 Claims, 7 Drawing Figures

POSITION AND VELOCITY SENSORS

BACKGROUND OF THE INVENTION

1. Field of the Invention

The present invention generally relates to position and velocity sensors and, more particularly, to a position sensor which provides a selected output when the sensor is at any one of a plurality of selected positions, and to a sensor which provides both position and velocity indicating signals.

2. Description of the Prior Art

In practically all position servo systems which are employed to position an element at any one of discrete positions, a position sensor and a velocity sensor are used. Typically, when the element is moved from one position to another, a position error signal is generated by the position sensor, which is used in driving the element to the desired position. As the element moves to the desired position, a velocity signal, indicative of the element's rate of movement or velocity is generated. It is used as a damping signal to control the element to reach the desired position and be maintained thereat without oscillation until a command is provided to move the element to a different position.

One type of a position sensor which has been used in the prior art includes a linear voltage differential transformer (LVDT). Typically, such a sensor generates an electrical signal, proportional to the displacement of the transformer core with respect to a center position, in response to an external physical motion. The transformer core is generally of high permeability material, e.g., bonded iron powder, which couples AC signals induced in the transformer primary into secondary windings of the transformer. The secondary windings are interconnected so that the AC signals induced in them are 180° out of phase. One example of a prior art LVDT is shown in U.S. Pat. No. 3,600,669.

As long as the transformer core is in its center position, so that the two AC voltages, induced in the two secondary windings, are of equal amplitude but 180° out of phase, the LVDT AC output is of zero amplitude. As the transformer core moves away from the center position the LVDT output amplitude increases from zero. It is related to the core position with respect to its center position. The phase of the LVDT output with respect to the phase of the AC signals in the primary winding is related to the displacement direction. Generally, the LVDT AC output is converted to a DC output signal whose amplitude and polarity are related to the LVDT AC output amplitude and phase, respectively. This DC output signal is the one generally referred to as the position signal. In a typical LVDT the output amplitude is only linearly related to the displacement to within several percents. In the above-referred-to patent, means are described to reduce the electrical output error over a displacement range from the null position to a maximum displacement position. The described LVDT provides only a position signal. However, it does not provide a signal indicative of the rate of movement or velocity of the transformer core.

In the prior art various velocity sensors or transducers, generally referred to as tachometers, are known. One example of a sensor designed to measure linear velocity of a moving element is described in U.S. Pat. No. 2,764,702. The described transducer is one in which a voltage is induced in a coil as a function of the rate of movement or velocity of magnetic-flux-providing means with respect to the stationary coil. Typically, a velocity transducer provides only an output signal indicative of velocity and does not provide any indication of the position of the magnetic-flux-providing means with respect to the coil.

Generally, prior art velocity sensors provide only a velocity signal, and position sensors provide only a position signal, in any application in which both velocity and position signals are required, e.g., a position servo system, two separate sensors must be provided. This is quite undesirable since the need for two separate sensors increases the overall cost of the servo system. Also, the two separate sensors increase the system size which in some cases may be most undesirable particularly where the space where the sensors are to be located is very limited. A need therefore exists for a small sensor capable of providing both position and velocity signals. Also, in applications in which an element is to be positioned at any one of discrete positions, a need exists for a relatively simple and reliable system for accurately positioning the element at any one of the desired positions.

OBJECTS AND SUMMARY OF THE INVENTION

It is a primary object of the present invention to provide a novel sensor for providing both position and velocity signals.

Another object of the invention is to provide a relatively simple, small and inexpensive sensor of the linear voltage differential transformer type which in addition to a position signal also provides a velocity signal.

A further object of the present invention is to provide a novel position sensor of the linear voltage differential transformer type controllable to provide a position indicating signal of a preselected amplitude when the transformer core is at any one of a plurality of selected positions in said transformer.

Yet a further object of the present invention is to provide a novel system for positioning an element at any one of several discrete positions with the element being moveable from one position to another in a selected positioning profile.

Some of the above-recited objects of the invention are achieved by providing a sensor of the linear voltage differential transformer type in which the moveable transformer core sometimes referred to as the slug, has both magnetic retentivity and high permeability properties. The core, due to its high permeability serves the same function as the core in a conventional LVDT. That is, it provides coupling between the transformer primary winding and the two transformer secondary windings so that AC signals are induced in the secondary windings when AC signals are applied to the transformer primary windings. The magnitudes of the signals, induced in the two secondary windings, depend on the core position with respect to the secondary windings. As will be pointed out hereinafter, in a preferred embodiment of the invention, the connections of the secondary windings are selectively controlled so that when the core is at any one of several positions, the sum of the signals, which are induced in the two secondary windings and are 180° out of phase with respect to one another, has a selected amplitude, e.g., zero, representing a null condition.

The transformer core, in addition to having high permeability properties, also serves as a polarized magnet. Consequently, as it moves with respect to the secondary windings, a signal, indicative of the rate of movement or velocity of the core, is induced in the secondary windings. This signal, which is effectively a DC signal, represents the velocity output signal of the sensor. Thus, the sensor of the present invention provides both position and velocity signals. The sensor with the position and velocity signals is incorporated in one embodiment of a position servo system, which is used to position an element at one of several discrete positions. The servo system includes means to control the element positioning profile, i.e., the manner in which it is moved from one position to the other.

The novel features of the invention are set forth with particularity in the appended claims. The invention will best be understood from the following description when read in conjunction with the accompanying drawings.

BRIEF DESCRIPTION OF THE DRAWINGS

FIG. 7 is a multiline waveform diagram useful in describing the system in FIG. 6.

DESCRIPTION OF THE PREFERRED EMBODIMENTS

Figure 1:
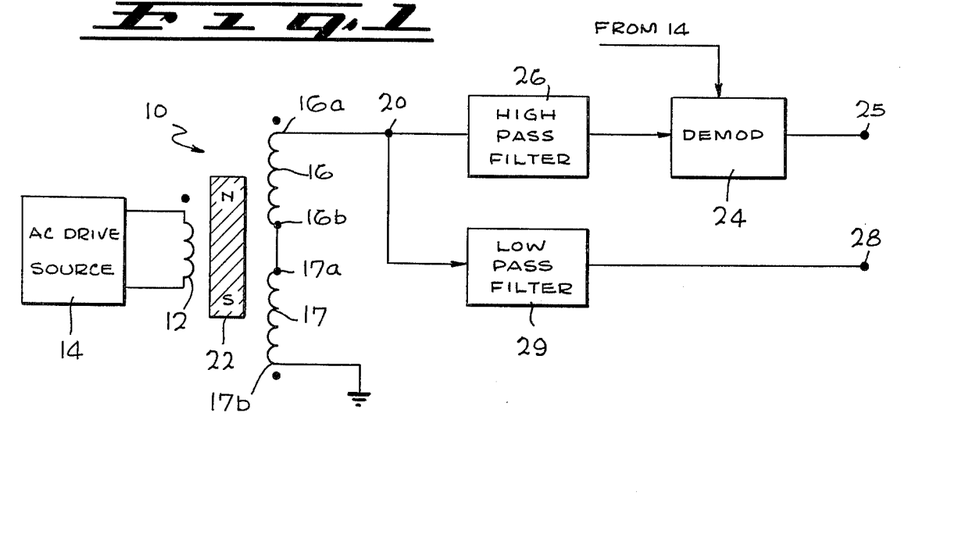
FIG. 1 is a general block diagram of one embodiment of a sensor providing both position and velocity signals.

Referring to FIG. 1 a general embodiment of the sensor of the present invention, which provides both position and velocity signals, is shown. The sensor 10 is of the linear voltage differential transformer (LVDT) type. It is shown including a primary winding, or simply a primary 12 to which an AC drive signal from a drive source 14 is applied. The sensor further includes a pair of secondary windings 16 and 17 which are interconnected, as represented by the conventional dots, so that in response to the AC drive signal in primary 12, AC signals are induced in the secondary windings 16 and 17 which are 180° out of phase with respect to one another. As shown, ends 16a and 16b of secondary winding 16 are connected to a terminal 20 and to end 17a of secondary winding 17, respectively. The other end 17b of secondary winding 17 is assumed to be grounded. Coupling of the AC signals from primary 12 into the secondary windings is provided by a transformer core 22.

The core 22, as in a conventional LVDT, has relatively high permeability to provide the desired AC signal coupling. The core is shown in its electrical center position, in which it is equally positioned with respect to the two secondary windings 16 and 17. Thus, any AC signals induced in the secondary windings are of equal amplitude, but 180° out of phase. Therefore, the amplitude of the AC signals at terminal 20 is zero. As is appreciated, when the core 22 moves away from the electrical center the amplitude of the AC signal at terminal 20 is other than zero. If the core 22 moves up more AC signal is induced in winding 16 than in 17. Therefore, a net output AC signal is present at terminal 20, which is assumed to be in phase with the drive signal from source 14. On the other hand if the core 22 moves down, the AC signal at terminal 20 is other than zero and is 180° out of phase with respect to the AC drive signal.

The amplitude of the AC signal at terminal 20 is therefore related to the magnitude of the displacement of the core 22 with respect to its electrical center, i.e., is related to the core position with respect to its electrical center. Typically, the terminal 20 is connected to a demodulator, such as synchronous demodulator 24, which phase demodulates the AC signal at terminal 20 with respect to the drive signal phase and provides a DC output signal at an output terminal 25. The DC output signal amplitude is related to the magnitude of the core displacement or position with respect to the center position and its polarity depends on whether the core position is one side or the other with respect to the center position. This output signal represents the sensor's position signal. As shown in FIG. 1, in the present invention the terminal 20 is connected to the demodulator 24 through a high pass filter 26 whose function will be described hereinafter.

As described thus far, the sensor 10 is similar to a prior art LVDT with a core 22 having high permeability properties. In accordance with the present invention the core 22, in addition to possessing high permeability to couple the AC drive signal to the secondary windings 16 and 17, also has magnetic retentivity. That is, it acts as a permanent magnet with north (N) and south (S) poles. Consequently, as it moves it induces a voltage in the series connected secondary windings 16 and 17. As a result, a DC voltage component is present at terminal 20 (with respect to ground for the connections as shown). The amplitude of this DC voltage is directly related to the rate of movement, i.e., the velocity, of the core, while the polarity of the DC voltage is related to the direction of movement. Thus, the DC voltage at terminal 20 represents a velocity signal.

In accordance with the present invention the voltage at terminal 20 is applied to a second output terminal of the sensor, designated 28, through a low pass filter 29. The function of the latter is to filter out the AC component of the voltage at terminal 20, which is indicative of core position, from reaching terminal 28, so that, thereat, only the velocity signal is applied. Thus, whereas the DC voltage at terminal 25 is a position signal, indicative of core position with respect to the center position, the DC voltage at terminal 28 is a velocity signal, indicative of the core velocity. The filtering characteristics of the filters 26 and 29 depend on the frequency of the AC drive signal from source 14. Filter 26 is designed to pass this frequency and cut off the DC component of the voltage at terminal 20, while filter 29 is designed to attenuate AC signals including AC drive signals, and effectively pass the DC voltage component. In one embodiment in which the drive signal is a square wave at 10 KHz, filter 26 is a 5 KHz high pass filter and filter 29 is a 2 KHz low pass filter.

In one embodiment the core 22 was formed as a slug, containing about 50% iron powder and the rest ceramic 5 magnetic powder bonded together by a hardening material, e.g., epoxy, and pressed into a desired shape, e.g., cylindrical. The slug had a permeability slightly less than that of iron powder and magnetic strength, slightly less than that of ceramic 5 magnetic powder. However, it had reasonably adequate permeability and magnetism so that the sensor 10 provided very adequate position and velocity signals.

Figure 2:
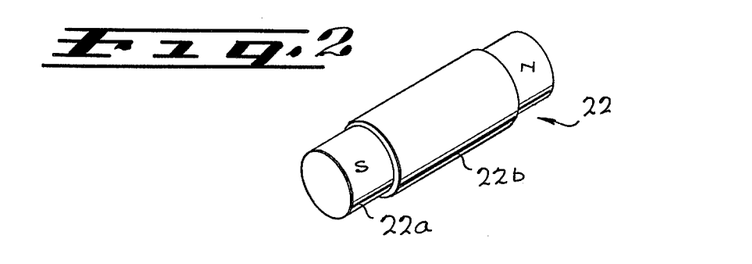
FIG. 2 is an isometric view of a core for use in the sensor shown in FIG. 1.

In another embodiment, as shown in FIG. 2, core 22 consists of a magnetic rod 22a, e.g., a rod of alnico 5 to which a layer of iron powder, designated by 22b, is bonded, such as with epoxy. It is believed that it is preferable to coat the magnetic rod 22a with the iron powder, except near the poledefining ends. In the particular embodiment, the dimensions of rod 22a and the layer of iron powder 22b are as follows:

rod 22a: L = 0.875 inch, O.D. = 0.157 inch iron powder 22b: L = 0.680 inch, O.D. = 0.250 inch From the foregoing it should thus be appreciated that by providing a LVDT type sensor with a core which, in addition to reasonably high permeability, also has magnetic retentivity and can act as a moving magnet adjacent the secondary windings thereby enabling the sensor to provide a velocity signal, in addition to providing the position signal. Thus, wherever both position and velocity signals are required, the single sensor of the present invention can be used. Since it performs the function, which heretofore could only be performed by two separate sensors, its incorporation eliminates the need for two separate sensors or transducers, which is most advantageous, where cost and/or space are factors.

In the sensor arrangement shown in FIG. 1 only the secondary windings are shown connected between ground and terminal 20. As is appreciated by those familiar with the art typically when so connected, in order for the sensor's position signal to be linearly related to the core position with respect to the center position, the sensor's secondary windings must be wound very precisely, thereby increasing the sensor's cost. Quite often a position sensor is incorporated in a position servo system, designed to move an element between any one of a plurality, e.g., two or more, discrete positions. In such an application the linearity of the sensor over the entire range of core positions is not important. Rather, it is important that the sensor povide very precise position signals for each of the positions in which the element is to be positioned.

For example, in U.S. Pat. No. 3,911,814 a "Hammer Bank Move Control System" is described. The control system is used to move a hammer bank of a printer to either one of two positions. Therein, a position signal which is provided by an electro-optical assembly is used together with a velocity signal from a tachometer in the servo system to control the precise positioning of the hammer bank at either of the two positions. The sensor of the present invention may be used with great advantage in such a system to provide both the required position and velocity signals. When incorporated in such a system the linearity of the sensor's position signal over the entire core positioning range is not important. Rather, it is important that the sensor provide very precise position signals when the hammer bank to which the core may be coupled is at either of the two discrete positions.

In any servo system, designed to move an element to any one of a plurality of discrete positions, it would be very advantageous if the position sensor were to provide a position signal of the same amplitude when the core is at any one of the desired positions. Hereinafter, for explanatory purposes only, the element to be moved will be referred to as the hammer bank. To simplify the servo circuitry it would be preferable to modify the sensor so that when the hammer bank is at any of the desired positions, the position signal of the sensor, whose core is attached to the hammer bank, is of zero amplitude, namely is zero.

Figure 3:
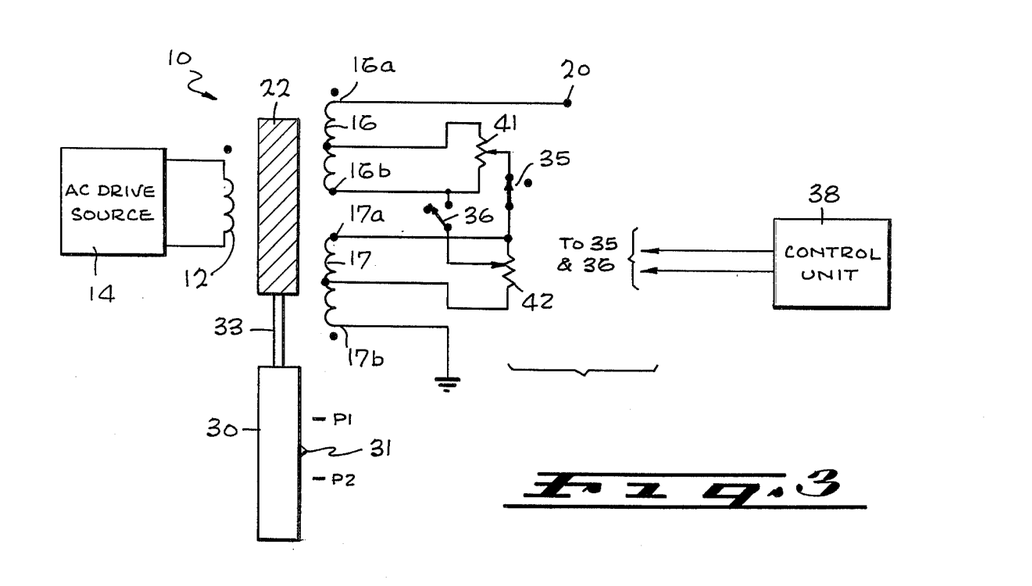
FIGS. 3-5 are different embodiments of a positioning sensor desgined to provide the same positioning signal at any one of a plurality of different core positions.

Such performance is achievable in accordance with the present invention in an embodiment which may best be explained in connection with FIG. 3, wherein elements like those previously described are designated by like numerals. In FIG. 3, numeral 30 designates a hammer bank, which is controlled to be at either of two precisely defined positions, designated P1 and P2. For explanatory purposes the hammer bank 30 is assumed to be properly positioned when a preselected point thereon, e.g., pointer 31 is at either of the two positions. The hammer bank 30 is shown coupled to the sensor's core 22 by a mechanical linkage member 33, and is assumed to be between the two desired positions.

In accordance with the present invention in one embodiment in order to control the hammer bank 30 to be precisely at either of the two positions, the sensor 10 includes two switches 35 and 36, and two potentiometers 41 and 42. Together, they are designed to control the interconnections between the two secondary windings 16 and 17, so that when the hammer bank 30 is at either position P1 or P2, the sensor's position signal is zero. In FIG. 3, the switches 35 and 36 are shown as mechanical switches for explanatory purposes only. However, in practice they may be, and typically are implemented as solid-state switches, which are assumed to be controlled by position command signals from an appropriate source, shown for example as a control unit 38.

As shown, switch 35 is connected between the end 17a of winding 17 and the moveable arm of potentiometer 41 which is connected across a selected number of turns of the secondary winding 16. Similarly, switch 36 is connected between secondary winding end 16b and the moveable arm of potentiometer 42 which is connected across turns of winding 17. It should be appreciated that the resistance of each potentiometer affects the magnitude of the AC signal which is induced in the turns across which the potentiometer is connected. Furthermore, by varying the position of the moveable arm of each potentiometer the portion of the signal, which is induced across the potentiometer, and which contributes to the summed signal at terminal 20 can be varied. Thus, it should be apparent that with switch 35 and 36 closed and open, respectively, one can vary the position of the arm of potentiometer 41 so that when the hammer bank 30 is at P1 the core 22 is in one position in the transformer in which the demodulated AC output signal, i.e., the position signal at terminal 25 is zero or a null. Similarly, with switches 35 and 36 open and closed respectively, one can vary the position of the arm of potentiometer 42 to null (zero) the position signal when the hammer bank is at position P2, and the core 22 is at a different position in the transformer.

Once the potentiometers' arm settings are chosen they are not changed. Since the distance between positions P1 and P2 is fixed, the displacement distance of the core when the hammer bank moves from one of the positions to the other is constant. Thus, when the hammer bank is at one position, e.g., P1 and switches 35 and 36 are closed and open respectively, so that the position signal is zero, when the hammer bank 30 is to be moved to P2, a command is provided to switches 35 and 36 to switch switches 35 and 36 to the open and closed positions, respectively. As long as the hammer bank remains at P1 the position signal is at a selected amplitude, e.g., V volts and of a first polarity, e.g., +, i.e., is +V volts.

Then as the hammer bank moves toward P2 the position signal amplitude decreases toward zero. Similarly, when the hammer bank 30 is at P2 and switches 35 and 36 are open and closed, respectively, so that the position signal is zero, when the bank 30 is to be moved to P1, switches 35 and 36 are closed and opened. As long as the bank remains at P2 the position signal is −V volts. Then as the hammer bank is moved toward P1 the position signal amplitude becomes less negative, until it is zero, i.e., at ground when position P1 is reached.

Figure 4:
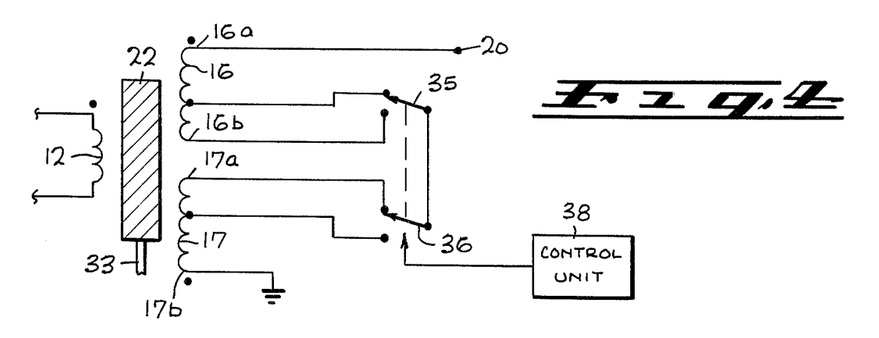

The particular arrangement, shown in FIG. 3, with the potentiometers 41 and 42 is particularly desirable since it enables the nulling (zeroing) of the sensor position signal at two different core positions even if the secondary windings 16 and 17 are not precisely identical. Thus, a relatively inexpensive LVDT, with other than precisely wound secondary windings, may be used to provide highly accurate position signals. It should be appreciated that if desired the potentiometers may be eliminated and the switches used to connect different numbers of turns of one secondary winding to the other so as to null the sensor position signal at either of the two positions. Such an arrangement is shown in FIG. 4. Therein, each of the two switches 35 and 36 is shown as a two-position switch. They are shown in a position in which less than all the turns of winding 16 are connected in series with all the turns of winding 17 to null the sensor position signal when the core 22 is at a position above the center position in which it is shown. By throwing the switches to their other position, such as by a command signal from unit 38, less than all the turns of winding 17 would be connected with all the turns of winding 16 to thereby null the sensor position signal when the core is below its center position in the sensor. In such an embodiment the taps of the secondary windings to which the switches are connected have to be located precisely to insure sensor nulling at either of the two selected core positions.

Figure 5:
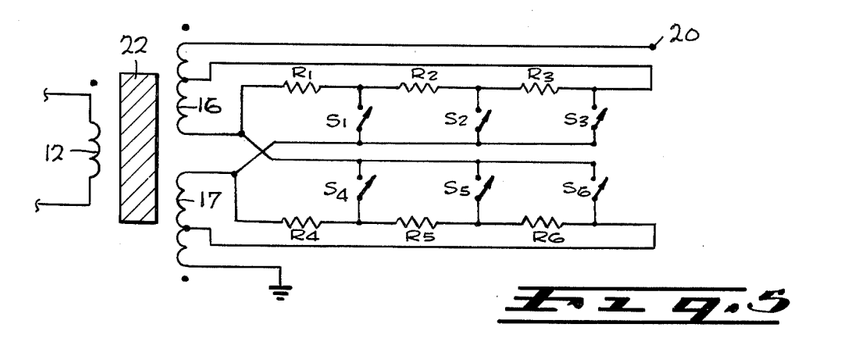

Although the sensors, shown in FIGS. 3 and 4, are desgined to provide a null, i.e., a zero position signal when the core is at either of two selected positions the invention is not intended to be limited thereto. Either sensor embodiment may be expanded to enable the sensor to produce a null when the core is at any of $n$ selected positions, where $n$ is an integer greater than 2. For example, as shown in FIG. 5, the sensor 10 may include resistors R1–R3 and R4–R6 connected across selected number of turns of windings 16 and 17, respectively. Separate switches S1–S6 may be connected to the resistor strings made up of resistors R1–R6. Clearly, by individually closing one of the switches, such as by separate commands from unit 38, the AC signal from secondary winding 16 or secondary winding 17 may be varied, and thereby control the core position at which a null is provided. With the particular combination the sensor 10 may be controlled to provide a null at any 6 core positions. If desired one or more of resistors R1–R6 may be potentiometers, and the switches may be used to select the potentiometer wiper desired.

It should be appreciated that the sensors described in connection with FIGS. 3–5 may include a core 22 which in addition to high permeability also serves as a magnet in order to provide a velocity signal, in addition to the position signal. However, the advantages of providing a null at any one of 6 different core positions may be realized with the sensor in which only a position signal is provided.

The novel sensor in which a null or zero position signal is provided whenever the core is at any one of a plurality of selected positions may be used quite advantageously in a position servo system to control the hammer bank 30 position. One example of such a system will be described in connection with FIG. 6. The system is assumed to control the movement of the hammer bank 30 between the two positions P1 and P2, and is responsive to a position signal from the sensor 10, shown in FIG. 3. The hammer bank 30 is assumed to be part of an impact printer and supports a plurality of impact hammers, so that in one hammer bank position the hammers are aligned with odd character positions and in the other hammer bank position the hammers are aligned with even character positions. An impact printer with a two position hammer bank is described in the above-referred-to U.S. Pat. No. 3,911,814.

Figure 6:
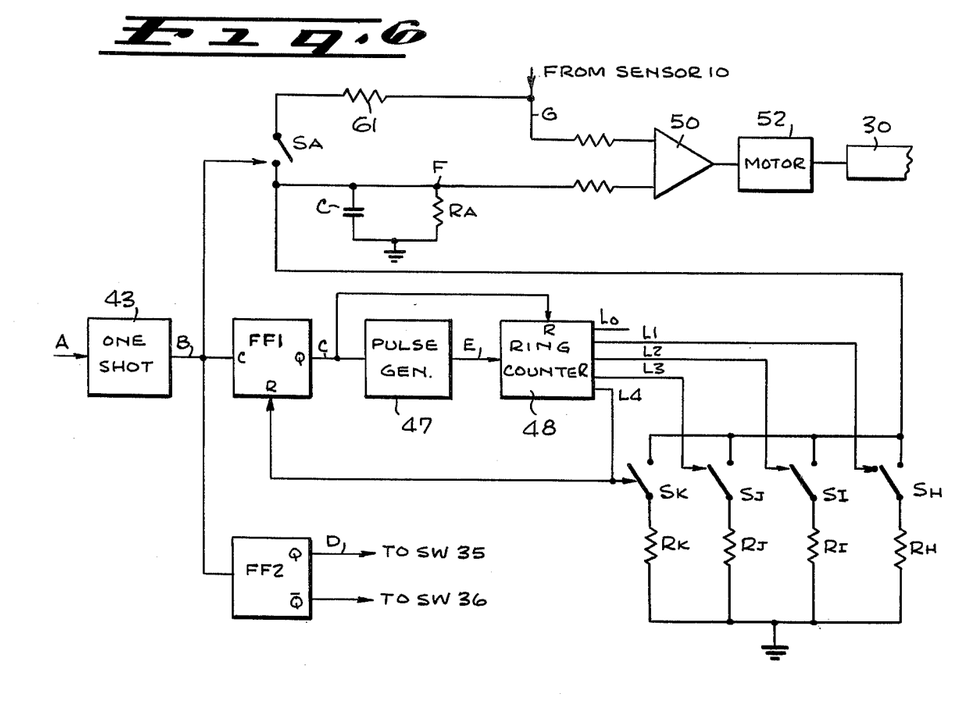
FIG. 6 is a block diagram useful in explaining one embodiment of a servo system for positioning an element in either of two positions.

As shown in FIG. 6, the system includes a one shot 43, two flip flops, FF1 and FF2, a pulse generator 47, a ring counter 48, and a differential output amplifier 50. The output of the latter which is a position error signal is assumed to be applied to a motor 52, or other actuator, which moves the hammer bank 30. The system as diagrammed in FIG. 6 will be described in connection with FIG. 7, wherein in lines $a$–$g$ various waveforms at points A–G in FIG. 6 are diagrammed. Lines $h$–$k$ are used to diagram the periods during which the normally open switches $S_H$, $S_I$, $S_J$ and $S_K$, shown in FIG. 6, are closed. Hereinafter all references to lines are to lines $a$–$k$ of FIG. 7.

For explanatory purposes let it be assumed that when the hammer bank is at P1, FF2 is in its reset state so that its Q output at point D is low as shown in line $d$. Alo, switches 35 and 36 (FIG. 3) are closed and open respectively, and the position signal from the sensor 10 at point G is zero. At this point in time the other input (point F) to amplifier 50 is also zero, so that the output of amplifier 50 is also zero, and the hammer bank is stabilized at point P1. When the hammer bank 30 is to be moved to point P2, a position command signal 55 (see line a) from an appropriate control circuit is applied to one shot 43. The negative edge of pulse 55 at time $t_0$ is assumed to trigger one shot 43 to provide a short duration pulse 57, which sets FF1 as shown by 58 in line $c$. Also, pulse 57 clocks FF2. Since it was reset, it is set so that its Q output (point D) goes high (see line $d$) and its $\overline{Q}$ output goes low. The high Q output closes switch 35 and the low $\overline{Q}$ output opens switch 36. Thus, the position signal of the sensor is no longer zero. As previously assumed it is +V and represents a position error corresponding to the distance between P1 and P2 when the hammer bank is at P1. The pulse 57 from one shot 43 closes a switch $S_A$ to thereby enable a capacitor C to be charged to the position signal, i.e., to +V through a small resistor 61. Since resistor 61 is small, the capacitor is quickly charged to +V. The pulse from 43 is sufficiently long to keep $S_A$ closed to enable C to charge up to the position signal. Thus, capacitor C charges up to +V, as represented in line F. The voltage thereacross is applied to amplifier 50. Since both its input are +V its output is zero so that the hammer bank remains temporarily at P1. In practice amplifier 50 is provided with feedback to prevent its output from changing from zero when the position signal at point G is +V and the capacitor charges up to +V.

As shown, a resistor $R_A$ is connected across capacitor C. Its function is to provide a permanent discharge path for C. $R_A$ is relatively large so that the discharge time is relatively long. Thus, the rate at which the capacitor is discharged is very low (see line f) and, therefore the output of amplifier 50 is low. Thus, the rate at which the hammer bank position is charged by motor 52 is low.

When FF1 is set at time $t_0$ (line c) it activates the pulse generator 47 which provides a sequence of pulses 61–64 at selected times $t_1$–$t_4$, respectively. The pulses are of equal shape. However, the intervals between them differ and are chosen to provide a desired positioning profile, as will be explained hereinafter. Each of pulses 61–64 steps the multiposition ring counter 48, which for explanatory purposes is assumed to be a five (0–4) stage counter. The counter's output lines L0–L4 are shown in FIG. 6. Use is made only of lines L1–L4, which are assumed to go high when the counter is in states 1–4, respectively. When FF1 is set it resets the counter to state 0 and therefore all output lines L1–L4 are low.

As shown in FIG. 6 a network of four resistors $R_H$–$R_K$ are respectively connected in series with switches $S_H$, $S_I$, $S_J$ and $S_K$, between ground and the ungrounded side of capacitor C. These four switches, which are shown in their open positions, are respectively controlled by the high outputs of lines L1–L4 respectively. The periods during which switches $S_H$–$S_K$ are closed are diagrammed on lines h–k. When the first pulse 61 from generator 47 is received at time $t_1$ by counter 48, it advances from state 0 to state 1. Therefore, L1 goes high, closing $S_H$. Therefore $R_H$ is connected in parallel with $R_A$ across C, thereby reducing the resistance across C, which results in increased discharge rate. Consequently, the difference between the two inputs to amplifier 50 increases, resulting in an increased rate of movement of the hammer bank toward position P2. It should be apparent however, that the amplitude of the position signal at point G decreases as the hammer bank 30 approaches the position P2.

Similarly, when at time $t_2$ pulse 62 steps counter 49 from state 1 to state 2, line L2 goes high and line L1 goes low. Thus, switch $S_H$ opens and $S_I$ closes, so that $R_I$ is in parallel with $R_A$. Likewise, when each of pulses 63 and 64 steps the counter 48 to state 3 and 4 respectively, switches $S_J$ and $S_K$ are closed so that $R_J$ and $R_K$ are connected in parallel with $R_A$. For explanatory purposes, it is assumed that when L4 goes high it resets FF1, and L4 remains high until at a later time FF1 is again set thereby resetting counter 48 to state 0. The resistors $R_H$–$R_K$ are chosen so that each of them together with $R_A$ controls the rate of discharge of C to result in a selected positioning profile of the hammer bank between positions P1 and P2. Basically, it is achieved by varying the rate of discharge of C. As shown in line g the profile is parabolic, which is believed to be advantageous since with such a profile the hammer bank is moved from one position to the other, first at a slow rate, followed by an increased rate which then decreases to prevent overshooting the position to which the bank is driven. As the bank 30 approaches P2 the voltage across the capacitor (point F) decreases and so does the position signal from the sensor at point G. When the bank 30 reaches P2 both inputs to amplifier 50 and its output are zero. Once the bank reaches P2 it is retained thereat until it is desired to return it to P1.

When the hammer bank is to be moved back to P1 another pulse 75 is applied to one shot 43 (see line a), which provides a trigger pulse 77 at time $t_5$ to FF1 and FF2. Since the latter was previously set, it is reset as represented in line c by 79. Thus, the Q and $\overline{Q}$ output of FF2 are low and high, respectively, causing switches 35 and 36 to open and close, respectively. As a result, the sensor provides a position signal of $-V$. Also, the pulse 77 from one shot 43 again closes $S_A$, which enables the capacitor C to charge up to the position signal which at this point in time is $-V$. Thus, briefly both inputs to amplifier 50 are $-V$ and therefore the bank remains at P2. However, as the capacitor starts to discharge toward ground the position signal at point G is more negative than the voltage across the capacitor C and therefore the amplifier 50 causes motor 52 to move the hammer bank toward P1.

The rest of the operation of the circuitry is as hereinbefore described and therefore will not be repeated. It is sufficient to state that as the bank 30 is moved to P1 the capacitor continues to discharge to ground and the position signal becomes less negative so that when the bank reaches P1 the two inputs to amplifier 50 are again at ground potential. It should be appreciated that in the system described in connection with FIGS. 6 and 7 use is made of the novel sensor 10 as shown in FIG. 3 in which a zero-amplitude position signal is provided when the hammer bank 30 is at either position P1 or P2. The fact that the position signal is zero when the desired position is reached is quite advantageous since it simplifies the servo circuitry. In the presently described system the position signal (line g) effectively follows the voltage across the discharging capacitor C. Also, the control of the rate of discharge of the capacitor provides a relatively simple arrangement for controlling the positioning profile of the hammer bank. Clearly, by controlling the resistance of $R_H$–$R_K$ and the duration during which each of switches $S_H$–$S_K$ is closed and/or by increasing the number of pulses from generator 47 the number of resistors like $R_H$–$R_K$ and the number of switches like $S_H$–$S_K$, any desired positioning profile may be formed.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. In a position sensor including a primary winding to which an AC signal is appliable, first and second secondary windings, a moveable core coupling said primary winding to said secondary windings, and connecting means for connecting said secondary windings so that AC signals induced therein as a function of the AC signal in said primary winding are 180° out of phase with respect to one another, the sensor providing an output signal whose amplitude is a function of the core position with respect to said secondary windings, the improvement comprising:

controllable means included in said connecting means for controlling the connections between the secondary windings to cause said sensor to provide an output signal of a same selected amplitude when said core is at any one of n different positions with respect to said secondary windings, where n is an integer not less than 2.

2. The improvement as described in claim 1 wherein each of said secondary windings includes a plurality of turns and said controllable means include switchable means for controlling the number of turns of each of said secondary windings which are serially connected to be in any one of *n* selected combinations of connections.

3. The improvement as described in claim 1 wherein said controllable means include resistive means and switchable means for controlling the connections between said secondary windings to be in any one of *n* selected different combinations of connections through said resistive means.

4. The improvement as described in claim 1 wherein each of said secondary windings consists of a plurality of turns and said controllable means include separate resistive means connected across selected number of turns of each of said secondary windings, and switch means for controlling the connections between each secondary winding and the resistive means connected to the other secondary winding to control said output signal to be of said selected amplitude when said core is at any of said *n* selected positions.

5. The improvement as described in claim 4 wherein the selected amplitude of said output signal is zero.

6. The improvement as described in claim 4 wherein the resistive means connected across the first of said secondary windings includes at least one variable resistor with a selectively moveable arm, and said switch means includes a switch for selectively connecting said moveable arm to the second of said secondary windings.

7. The improvement as described in claim 1 wherein said controllable means include first and second resistive means respectively connected across selected numbers of turns of said first and second secondary windings, each of said resistive means including a variable resistor with a moveable arm, said controllable means including first and second switches for selectively connecting the moveable arms of the variable resistors of said first and second resistive means to said second and first secondary windings, respectively.

8. The improvement as described in claim 1 wherein $n=2$ and said controllable means include first and second variable resistors respectively connected across selected numbers of turns of said first and second secondary windings, and first and second switches for selectively connecting the moveable arms of said first and second variable resistors to said second and first secondary windings, respectively.

9. In a sensor comprising a primary winding to which AC drive signals are appliable, a pair of secondary windings and a moveable core of the type having relatively high permeability properties for coupling signals corresponding to said AC drive signals into said secondary windings, means for interconnecting said secondary windings so that AC signals coupled therein by the core in response to the drive signals are 180° out of phase with respect to one another, with the sensor providing a position signal whose amplitude is a function of the core position with respect to said secondary windings, and further including controllable means coupled to said secondary windings for controlling the connections therebetween to cause said position signal to be of a same selected amplitude when said core is at any one of *n* different positions with respect to said secondary windings, where *n* is an integer not less than 2, the improvement comprising:

said core having magnetic retentivity, whereby as said core moves with respect to said secondary windings it induces a DC signal in said secondary windings, the DC signal amplitude being related to the rate of movement of said core.

10. The improvement as described in claim 9 wherein said core is of preselected dimension and is formed of a hardened mixture of matter exhibiting relatively high permeability and magnetic retentivity.

11. The improvement as described in claim 9 wherein said core comprises an elongated magnetic member of preselected cross section in a direction transverse to its length and matter of relatively high permeability fixedly connected to at least a portion of the outer surface of said elongated magnetic member.

12. The improvement as described in claim 11 wherein said relatively high permeability matter extends outwardly from said magnetic member about most of its length except near its opposite ends.

13. The improvement as described in claim 9 wherein each of said secondary windings includes a plurality of turns and said controllable means include switchable means for controlling the number of turns of each of said secondary windings which are serially connected to be in any one of *n* selected combinations of connections.

14. The improvement as described in claim 9 wherein said controllable means include resistive means and switchable means for controlling the connections between said secondary windings to be in any one of *n* selected different combinations of connections through said resistive means.

15. The improvement as described in claim 9 wherein each of said secondary windings consists of a plurality of turns and said controllable means include separate resistive means connected across selected number of turns of each of said secondary windings, and switch means for controlling the connections between each secondary winding and the resistive means connected to the other secondary winding to cause said position signal to be of said selected amplitude when said core is at any of said *n* selected position.

16. The improvement as described in claim 15 wherein the resistive means connected across the first secondary winding includes at least one variable resistor with a selectively moveable arm, and said switch means includes a switch for selectively connecting said moveable arm to the second secondary winding.

17. The improvement as described in claim 15 wherein the selected amplitude of said position signal is zero.

18. The improvement as described in claim 9 wherein said controllable means include first and second resistive means respectively connected across selected numbers of turns of said first and second secondary windings, each of said resistive means including a variable resistor with a moveable arm, said controllable means including first and second switches for selectively connecting the moveable arms of the variable resistors of said first and second resistive means to said second and first secondary windings, respectively.

19. The improvement as described in claim 9 wherein $n=2$ and said controllable means include first and second variable resistors respectively connected across selected numbers of turns of said first and second secondary windings, and first and second switches for selectively connecting the moveable arms of said first and second variable resistors to said second and first secondary windings, respectively.

20. A hammer bank system useful in an impact printer of the type including a printer control section for controlling the printer operation, the hammer bank system comprising:

a moveable hammer bank;

drive means coupled to said hammer bank for driving the hammer bank to be at any one of $n$ positions where $n$ is an integer not less than 2; and control means responsive to a command signal for controlling said drive means to drive said hammer bank from one of said $n$ positions to another, said control means including a sensor coupled to said hammer bank, said sensor including a primary winding to which AC drive signals are appliable, first and second secondary windings, a moveable core, and controllable means for controlling the connections between said secondary windings so that AC signals induced therein as a function of the AC drive signals in said primary winding are 180° out of phase with respect to one another, and for providing a position signal which is of a same selected amplitude when said core is at any of said $n$ positions with respect to said secondary windings.

21. The system as described in claim 20 wherein said control means include movement rate control means for controlling the rate of movement of said hammer bank by said drive means between any of said positions.

22. The system as described in claim 20 wherein said controllable means include resistive means and switchable means for controlling the connections between said secondary windings to be in any one of $n$ selected different combinations of connections through said resistive means.

23. The system as described in claim 20 wherein said core has relatively high permeability properties and further has magnetic retentivity, to thereby induce a DC signal in said secondary windings which is related to the rate of movement of said core with respect to said secondary windings.

24. The system as described in claim 20 wherein each of said secondary windings consists of a plurality of turns and said controllable means include separate resistive means connected across selected number of turns of each of said secondary windings, and switch means for controlling the connections between each secondary winding and the resistive means connected to the other secondary winding to control said output signal to be of said selected amplitutde when said core is at any of said $n$ selected positions.

25. The system as described in claim 24 wherein the selected amplitude of said output signal is zero.

26. The system as described in claim 24 wherein said core has relatively high permeability properties and further has magnetic retentivity, to thereby induce a DC signal in said secondary windings which is related to the rate of movement of said core with respect to said secondary windings.

27. The system as described in claim 26 wherein the selected amplitude of said output signal is zero.

28. The system as described in claim 26 wherein the resistive means connected across the first of said secondary windings includes at least one variable resistor with a selectively moveable arm, and said switch means includes a switch for selectively connecting said moveable arm to the second of said secondary windings.

29. The system as described in claim 28 wherein $n=2$ and said controllable means include first and second variable resistors respectively connected across selected numbers of turns of said first and second secondary windings, and first and second switches for selectviely connecting the moveable arms of said first and second variable resistors to said second and first secondary windings, respectively.

30. The system as described in claim 29 wherein the selected amplitude of said output signal is zero.

31. The system as described in claim 21 wherein said movement rate control means include means for controlling the hammer bank to move from one of said positions to another at rates which vary from a selected high rate to a selected low rate.

* * * * *